United States Patent
Ng et al.

(10) Patent No.: US 11,332,010 B2
(45) Date of Patent: May 17, 2022

(54) APPARATUS FOR A VEHICLE, METHOD FOR CONTROLLING THE SAME, AND DISPLAY FOR A VEHICLE

(71) Applicant: Continental Automotive GmbH, Hannover (DE)

(72) Inventors: Chin Tak Ng, Singapore (SG); Adrian Ii Macasaquit, Singapore (SG); Kevindran Pillay Mauree, Singapore (SG)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 524 days.

(21) Appl. No.: 16/328,342

(22) PCT Filed: Oct. 14, 2016

(86) PCT No.: PCT/EP2016/074652
§ 371 (c)(1),
(2) Date: Feb. 26, 2019

(87) PCT Pub. No.: WO2018/068860
PCT Pub. Date: Apr. 19, 2018

(65) Prior Publication Data
US 2021/0276419 A1    Sep. 9, 2021

(51) Int. Cl.
*B60K 35/00* (2006.01)
*B60K 37/04* (2006.01)
*G09F 9/37* (2006.01)

(52) U.S. Cl.
CPC .............. *B60K 37/04* (2013.01); *B60K 35/00* (2013.01); *G09F 9/37* (2013.01);
(Continued)

(58) Field of Classification Search
CPC ......... B60R 11/0235; B60R 2011/0092; B60R 2011/0087; B60K 35/00; B60K 37/04;
(Continued)

(56) References Cited

U.S. PATENT DOCUMENTS 6,816,177 B2   11/2004  Wang et al.
7,289,085 B2   10/2007  Adams et al.
(Continued)

FOREIGN PATENT DOCUMENTS

DE   102005043558 A1   3/2007
EP       2181897 A2    5/2010
(Continued)

OTHER PUBLICATIONS

Edmunds.com., "2010 Honda Accord CrossTour Long-Term Road Test", 2010, 15 pages.
(Continued)

*Primary Examiner* — Christopher E Leiby
(74) *Attorney, Agent, or Firm* — RatnerPrestia

(57) ABSTRACT

According to embodiments of the present invention, an apparatus for a vehicle is provided. The apparatus includes a support structure adapted to support a display panel, a drive assembly capable of selectively driving the support structure to rotate about a first axis and to rotate about a second axis, the first axis being different from the second axis, and a sensor arrangement located at a first predetermined position along a path of the rotation about the first axis and at a second predetermined position along a path of the rotation about the second axis, the sensor arrangement being configured to directly detect the support structure selectively at the first and second predetermined positions. According to further embodiments of the present invention, a display for a vehicle and a method for controlling an apparatus for a vehicle are also provided.

25 Claims, 13 Drawing Sheets

(52) U.S. Cl.
CPC .. *B60K 2370/146* (2019.05); *B60K 2370/148* (2019.05); *B60K 2370/1464* (2019.05); *B60K 2370/152* (2019.05); *B60K 2370/67* (2019.05); *B60K 2370/744* (2019.05); *B60K 2370/816* (2019.05)

(58) Field of Classification Search
CPC ............. B60K 37/06; B60K 2370/744; B60K 2370/146; B60K 2370/736; B60K 2370/816; B60K 2370/148; B60K 2370/152; B60K 2370/1464; B60K 2370/67; G09F 9/37
See application file for complete search history.

(56) References Cited

U.S. PATENT DOCUMENTS

| | | | |
|---|---|---|---|
| 2006/0164230 A1* | 7/2006 | DeWind | B60K 35/00 340/461 |
| 2006/0262033 A1 | 11/2006 | Shen et al. | |
| 2010/0108844 A1 | 5/2010 | Ogawa | |
| 2013/0147847 A1* | 6/2013 | Koseki | B60R 11/0235 345/660 |
| 2014/0153168 A1* | 6/2014 | Hida | B60K 37/04 361/679.01 |
| 2016/0161943 A1* | 6/2016 | Wikander | H04N 5/00 318/3 |
| 2017/0322760 A1* | 11/2017 | Soh | G06F 3/1446 |

FOREIGN PATENT DOCUMENTS

JP    2008001209 A    1/2008
WO    03082621 A1    10/2003

OTHER PUBLICATIONS

International Search Report and Written Opinion for International Application No. PCT/EP2016/074652, dated Jun. 14, 2017—9 pages.
European Examination Report for European Application No. 16787360.3, dated Nov. 25, 2020, 4 pages.

* cited by examiner

APPARATUS FOR A VEHICLE, METHOD FOR CONTROLLING THE SAME, AND DISPLAY FOR A VEHICLE

CROSS REFERENCE TO RELATED APPLICATIONS

This application is the U.S. National Phase Application of PCT International Application No. PCT/EP2016/074652, filed Oct. 14, 2016, the contents of such application being incorporated by reference herein.

FIELD OF THE INVENTION

Various embodiments relate to an apparatus for a vehicle, a method for controlling an apparatus for a vehicle, and a display for a vehicle.

BACKGROUND OF THE INVENTION

Generally, displays may be provided in cars. Some issues related to the displays include poor display visibility due to exposure to sunlight, and, as illustrated in FIG. 1, limited display viewing angle 192a, 192b to the vehicle users due to the fixed display 190a, 190b in the vehicle.

Other display type includes a recessed display in the car dashboard, which is commonly used to shade the display from direct sunlight. However, such a recessed display in the car dashboard is limited by the dashboard design.

Angle adjusting mechanisms may be provided to rotate the display. However, for some of these mechanisms, display adjustment is only available in a single direction (e.g., up/down).

There are also displays where the display observation angle is multi-directionally adjustable. One example of such a display includes a mechanism to retract and rotate the display in multi-directions, thereby enabling display adjustment which is multi-directional. However, the adjustment in the up/down direction is achieved by a retractable mechanism, which limits its usage only in a retractable display application. Such a display does not address two-direction rotation for a stand-alone display without a retractable function. Further, the position detection of the display is achieved by detecting the operation state of the gear sets. In situation when the display position is not synchronized with the gear position, the actual display position will be unknown to the system. The inaccurate control of the display position weakens its functions in various applications.

SUMMARY OF THE INVENTION

According to an embodiment, an apparatus for a vehicle is provided. The apparatus may include a support structure adapted to support a display panel, a drive assembly capable of selectively driving the support structure to rotate about a first axis and to rotate about a second axis, the first axis being different from the second axis, and a sensor arrangement located at a first predetermined position along a path of the rotation about the first axis and at a second predetermined position along a path of the rotation about the second axis, the sensor arrangement being configured to directly detect the support structure selectively at the first and second predetermined positions.

According to an embodiment, a display for a vehicle is provided. The display may include the apparatus as described herein, and a display panel supported by the support structure of the apparatus.

According to an embodiment, a method for controlling an apparatus for a vehicle is provided. The method may include selectively driving a support structure of the apparatus to rotate about a first axis and to rotate about a second axis, the first axis being different from the second axis, wherein the support structure is adapted to support a display panel, and directly detecting the support structure selectively at a first predetermined position along a path of the rotation about the first axis and at a second predetermined position along a path of the rotation about the second axis.

BRIEF DESCRIPTION OF THE DRAWINGS

In the drawings, like reference characters generally refer to like parts throughout the different views. The drawings are not necessarily to scale, emphasis instead generally being placed upon illustrating the principles aspects of the invention. In the following description, various embodiments of the invention are described with reference to the following drawings, in which.

DETAILED DESCRIPTION OF THE PREFERRED EMBODIMENTS

The following detailed description refers to the accompanying drawings that show, by way of illustration, specific details and embodiments in which aspects of the invention may be practiced. These embodiments are described in sufficient detail to enable those skilled in the art to practice aspects of the invention. Other embodiments may be utilized and structural, logical, and electrical changes may be made without departing from the scope of aspects of the invention. The various embodiments are not necessarily mutually exclusive, as some embodiments can be combined with one or more other embodiments to form new embodiments.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the phrase "at least substantially" may include "exactly" and a reasonable variance.

As used herein, the term "and/or" includes any and all combinations of one or more of the associated listed items.

As used herein, the phrase of the form of "at least one of A or B" may include A or B or both A and B. Correspondingly, the phrase of the form of "at least one of A or B or C", or including further listed items, may include any and all combinations of one or more of the associated listed items.

Various embodiments may relate to a car infotainment product or apparatus.

Various embodiments may provide an adjustable display mechanism in two directions.

Various embodiments may provide a stand-alone adjustable display mechanism which may enable rotation of the display (or display panel) in different directions (e.g., Z-direction: left, right, and Y-direction: up, down), with accurate display position control. Various embodiments not only provide an improvement over the existing fixed viewing angle from a display, but may also allow a display to be adjusted to avoid direct exposure to sunlight for better visibility.

Figure 1:
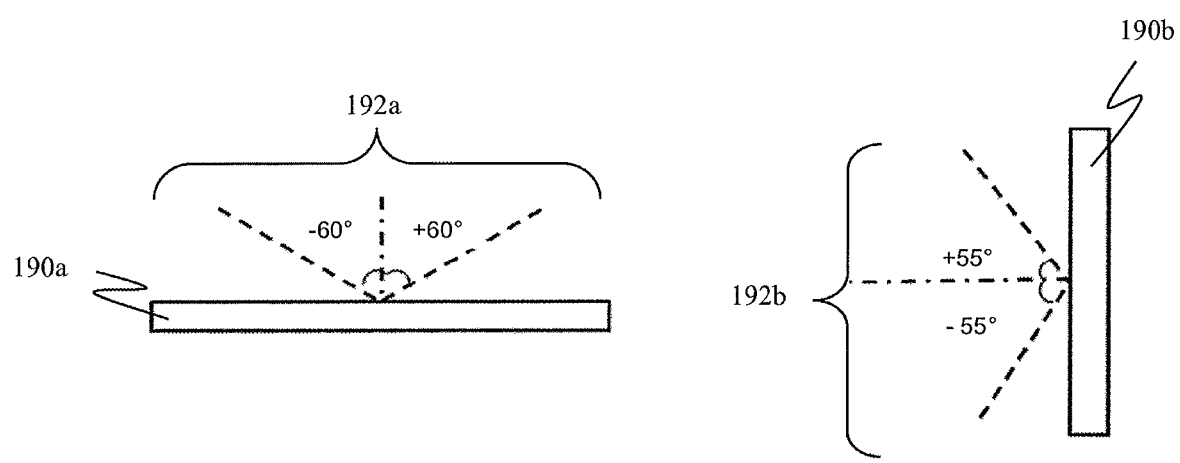
FIG. 1 shows schematic cross sectional views illustrating a typical viewing angle of a display.
Figure 2A:
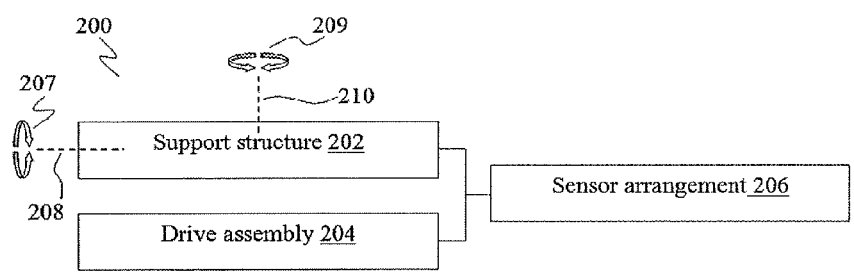
FIG. 2A shows a schematic diagram of an apparatus for a vehicle, according to various embodiments.

FIG. 2A shows a schematic diagram of an apparatus 200 for a vehicle, according to various embodiments. The apparatus 200 includes a support structure 202 adapted to support a display panel, a drive assembly 204 capable of selectively driving the support structure 202 to rotate (represented by the arrows 207) about a first axis 208 and to rotate (represented by the arrows 209) about a second axis 210, the first axis 208 being different from the second axis 210, and a sensor arrangement 206 located at a first predetermined position along a path of the rotation about the first axis 208 and at a second predetermined position along a path of the rotation about the second axis 210, the sensor arrangement 206 being configured to directly detect the support structure 202 selectively at the first and second predetermined positions.

In other words, an apparatus 200 suitable for installation in a vehicle may be provided. The apparatus 200 may be provided for adjustment of the display/viewing angle of a display in a vehicle. The apparatus 200 may include a support structure 202, where a display panel (or a display assembly) may be supported and/or secured. As a non-limiting example, a display panel may be removably supported by or removably secured to the support structure 202. The display panel may display information (e.g., in the form of texts and/or graphics). The display panel may be a flat display panel. The display panel may include a liquid crystal display (LCD) unit or an organic light-emitting diode (OLED) display unit.

The apparatus 200 may further include a drive assembly 204 which may be capable of selectively moving the support structure 202 (and the display panel when present and supported by the support structure 202) in a first rotational path about a first axis 208 and in a second rotational path about a second axis 210. Depending on usage or circumstances or user input/signal, the drive assembly 204 may selectively drive the support structure 202 to rotate about the first axis 208 or may selectively drive the support structure 202 to rotate about the second axis 210, or may drive the support structure 202 to rotate about the first axis 208 and also rotate about the second axis 210.

The apparatus 200 may further include a sensor arrangement 206 arranged or located at different positions of the apparatus 200. For example, the sensor arrangement 206 may be arranged at a first predetermined position along a path of the rotation about the first axis 208 such that when the support structure 202 is rotated about the first axis 208 and coincides with the first predetermined position, the support structure 202 may be directly detected by the sensor arrangement 206 at the first predetermined position, e.g., by direct interaction of the support structure 202 with the sensor arrangement 206 at the first predetermined position. The sensor arrangement 206 may also be arranged at a second predetermined position along a path of the rotation about the second axis 210 such that when the support structure 202 is rotated about the second axis 210 and coincides with the second predetermined position, the support structure 202 may be directly detected by the sensor arrangement 206 at the second predetermined position, e.g., by direct interaction of the support structure 202 with the sensor arrangement 206 at the first predetermined position. In this way, the support structure 202 may be directly detected by the sensor arrangement 206 selectively at the first predetermined position and/or second predetermined position depending on the rotation of the support structure 202 driven selectively by the drive assembly 204. Accordingly, an orientation of the support structure 202 may be determined via direct detection of the support structure 202 by the sensor arrangement 206 arranged or located at the first predetermined position and the second predetermined position.

In various embodiments, the support structure 202 may interact with the sensor arrangement 206 at the first predetermined position and/or the second predetermined position, thereby triggering detection by the sensor arrangement 206. As a non-limiting example, the sensor arrangement 206 may include a first sensor arranged at the first predetermined position and a second sensor arranged at the second predetermined position.

In various embodiments, it should be appreciated that the apparatus 200 may further include a processor electrically coupled to the sensor arrangement 206. As a non-limiting example, upon detection of the support structure 202 by the sensor arrangement 206 at the first predetermined position and/or the second predetermined position, the sensor arrangement 206 may supply a detection signal to the, processor. In this way, the processor and, overall, the apparatus 200 may be informed or may be aware that the support structure 202 is at the first predetermined position along the rotational path of the support structure 202 about the first axis 208 and/or at the second predetermined position along the rotational path of the support structure 202 about the second axis 210.

The processor may also be electrically coupled to the drive assembly 204. The processor may supply a driving signal to the drive assembly 204 to selectively drive the support structure 202 to rotate about the first axis and to rotate about the second axis.

In various embodiments, as the drive assembly 204 may be capable of driving the support structure 202 to rotate about different axes, this may mean that the support structure 202 may be driven multi-directionally, and therefore, the apparatus 200 may be a multi-directionally driven apparatus.

In various embodiments, the support structure 202 may be driven to rotate bi-directionally about the first axis 208 (e.g., clockwise and anti-clockwise rotations about the first axis 208) and/or driven to rotate bi-directionally about the second axis 210 (e.g., clockwise and anti-clockwise rotations about the second axis 210).

In various embodiments, the drive assembly 204 may include a plurality of drivers and/or gears (or gear sets) to drive the support structure 202.

In various embodiments, it should be appreciated that as the drive assembly 204 drives the support structure 202 so as to move/rotate the support structure 202, the drive assembly 204 may be defined as the "driving portion" of the apparatus 200 while the support structure 202 may be defined as the "driven portion" of the apparatus 200.

In various embodiments, the sensor arrangement 206 may directly detect the support structure 202 (defined as the "driven portion" of the apparatus 200) at respective predetermined positions along the path of the rotation about the first axis 208 (e.g., first rotational path) and along the path of the rotation about the second axis 210 (e.g., second rotational path) to directly determine the orientation of the support structure 202 and, therefore, the display position, rather than by conventional indirect means, for example, by detecting the state of the gear sets or drivers to indirectly determine the display position. In this way, a more accurate determination of the positions of the support structure 202 (and the display panel when present and supported by the support structure 202) may be obtained and/or maintained as the conventional indirect method of detection of the operation state of gear sets or drivers may be inaccurate in the event that there is misalignment in the gear sets for driving the display or where the display position is not synchronized with the gear position.

In various embodiments, the first axis 208 and the second axis 210 may be at least substantially perpendicular to one another. As a non-limiting example, the first axis 208 may be a horizontal axis (e.g., Y-axis) such that the support structure 202 may be rotated (e.g., ±Y-direction) so that a display panel when present and supported by the support structure 202 may face in an upward or downward direction, and the second axis 210 may be a vertical axis (e.g., Z-axis) such that the support structure 202 may be rotated (e.g., ±Z-direction) so that a display panel when present and supported by the support structure 202 may face in a leftward or rightward direction.

In the context of various embodiments, the term "vehicle" may include a vehicle for land transportation (e.g., cars, buses, trains, etc.), water transportation (boats, ships, etc.) and air transportation (e.g., aeroplane, aircraft, etc.)

In various embodiments, the sensor arrangement 206 may be arranged to directly interact with the support structure 202 selectively at the first and second predetermined positions to directly detect the support structure 202 selectively at the first and second predetermined positions As a non-limiting example, a first portion of the support structure 202 may directly interact with the sensor arrangement 206 at the first predetermined position so that the sensor arrangement 206 may directly detect the support structure at the first predetermined position. A second (different) portion of the support structure 202 may directly interact with the sensor arrangement 206 at the second predetermined position so that the sensor arrangement 206 may directly detect the support structure at the second predetermined position.

In various embodiments, the support structure 202 may include a turn-table, and a display holder hingedly connected to the turn-table, the display holder being adapted to receive the display panel, wherein the drive assembly 204 may be capable of selectively driving the display holder to rotate about the first axis 208 and the turn-table to rotate about the second axis 210. It should be appreciated that, in various embodiments where the turn-table is rotated or driven to be rotated about the second axis 210, the display holder is also indirectly rotated about the second axis 210 in line with the rotation of the turn-table as the display holder is hingedly connected to the turn-table. As described, each of the turn-table and the display holder may be movable or rotatable. The display holder and the turn-table may be independently driven to rotate about the first axis 208 and the second axis 210 respectively by the drive assembly 204.

In various embodiments, the display holder may include a space or recess to receive the display panel.

In various embodiments, the support structure 202 may further include a (fixed) frame structure, where the turn-table may be pivotally coupled to the frame structure.

In various embodiments, the drive assembly 204 may include a first drive unit arranged to drive the display holder to rotate about the first axis 208, and a second drive unit arranged to drive the turn-table to rotate about the second axis 210. A part of the first drive unit may be coupled to the display holder and/or a part of the second drive unit may be coupled to the turn-table.

In various embodiments, the first drive unit may include a first motor having a first driving element, and a first driven element coupled to the display holder, wherein the first driving element and the first driven element may be arranged to cooperatively drive the display holder to rotate about the first axis 208. In this way, during operation of the first motor, the first driving element may drive the first driven element to drive the display holder to rotate about the first axis 208.

The first motor may be a stepper motor. The first motor may be arranged on or on top of the turn-table or coupled to the turn-table. The first driven element may be arranged on the display holder, e.g., on a side of the display holder, or coupled to the display holder. The first driven element may be arranged at a base portion of the display holder. Each of the first driving element and the first driven element may include a gear or a pinion.

In various embodiments, the first driving element and the first driven element may directly engage each other, in other words, in contact with one another, for driving the display holder to rotate about the first axis 208.

In various embodiments, the first drive unit may further include a timing belt engaged with the first driving element and the first driven element for cooperatively driving the display holder to rotate about the first axis 208. The first driving element and the first driven element may be spaced apart from each other and may be coupled to one another via the timing belt. The first driven element may be arranged at a central portion of the display holder.

In various embodiments, the second drive unit may include a second motor having a second driving element, and a second driven element coupled to the turn-table, wherein the second driving element and the second driven element may be arranged to cooperatively drive the turn-table to rotate about the second axis 210. In this way, during operation of the second motor, the second driving element may drive the second driven element to drive the turn-table to rotate about the second axis 210.

The second motor may be a stepper motor. The second driven element may be arranged on the turn-table, e.g., on an underside of the turn-table, or coupled to the turn-table. Each of the second driving element and the second driven element may include a gear or a pinion.

In various embodiments, the first motor and the second driven element may be arranged on opposite sides of the turn-table.

In various embodiments, the second driving element and the second driven element may directly engage each other, in other words, in contact with one another, for driving the turn-table to rotate about the second axis 210.

In various embodiments, the support structure 202 may further include a frame structure, wherein the turn-table may be pivotally coupled to the frame structure, and wherein the second motor may be supported on the frame structure. The frame structure may be a fixed or non-movable structure. The second motor may be arranged on the frame structure or coupled to the frame structure.

In various embodiments, the sensor arrangement 206 may be arranged to directly interact with the display holder to directly detect the display holder at the first predetermined position, and to directly interact with the turn-table to directly detect the turn-table at the second predetermined position.

In various embodiments, the display holder may include a first interrupting member, wherein the sensor arrangement 206 may be configured to interact with the first interrupting member to directly detect the display holder at the first predetermined position (for determining an orientation of the display holder), and wherein the turn-table may include a second interrupting member, wherein the sensor arrangement 206 may be configured to interact with the second interrupting member to directly detect the turn-table at the second predetermined position (for determining an orientation of the turn-table, and indirectly also that of the display holder). In this way, the display holder, with the first interrupting member, may be the first portion of the support structure 202 that may directly interact with the sensor arrangement 206 at the first predetermined position so that the sensor arrangement 206 may directly detect the support structure 202 at the first predetermined position, while the turn-table, with the second interrupting member, may be the second (different) portion of the support structure 202 that may directly interact with the sensor arrangement 206 at the second predetermined position so that the sensor arrangement 206 may directly detect the support structure 202 at the second predetermined position. The first interrupting member may be a projection or extension of the display holder, e.g., an element projecting from the display holder. The second interrupting member may be a projection or extension of the turn-table, e.g., an element projecting from the turn-table.

In various embodiments, the sensor arrangement 206 may include a first sensor located at the first predetermined position to interact with the first interrupting member, and a second sensor located at the second predetermined position to interact with the second interrupting member.

In various embodiments, the first sensor may be coupled to or arranged on the turn-table and/or the second sensor may be coupled to or arranged on the frame structure.

In various embodiments, each of the first sensor and the second sensor may include an optical sensor. The term "optical" may include ultraviolet (UV), visible light and infrared (IR).

In various embodiments, the optical sensor may be an infrared (IR) sensor such that each of the first sensor and the second sensor may include an IR sensor.

It should be appreciated that each of the first sensor and the second sensor may be of other types of sensors, e.g., force or pressure-sensitive sensors.

In various embodiments, the apparatus 200 may further include a processor, wherein the first predetermined position defines a first end position along the path of the rotation about the first axis 208, and wherein the second predetermined position defines a second end position along the path of the rotation about the second axis 210, and in response to the detection of the support structure 202 by the sensor arrangement 206 selectively at the first end position and the second end position, the processor may be configured to provide a fault signal to the drive assembly 204 to prevent any corresponding rotation of the support structure 202 about at least one of the first axis 208 or the second axis 210 beyond the first end position and the second end position. The processor may be electrically coupled to the drive assembly 204 and/or the sensor arrangement 206.

In the context of various embodiments, the first end position and the second end position may be a respective end or extreme position defined for the respective path of the rotation about the first axis 208 and the second axis 210, beyond which respective rotation of the support structure 202 about the first axis 208 and the second axis 210 may not be permitted so as to prevent over-rotation of the support structure 202 that may otherwise cause damage to the support structure 202, and to the apparatus 200 overall.

As a non-limiting example, where the sensor arrangement 206, for directly detecting the support structure 202, detects an interaction of the first sensor with the first interrupting member at the first predetermined position (being the first end position) and/or the interaction of the second sensor with the second interrupting member at the second predetermined position (being the second end position), the processor, in response, may be configured to provide a fault signal to the drive assembly 204 to prevent any further rotation of the support structure 202 about at least one of the first axis 208 and/or the second axis 210 beyond the first predetermined position and/or the second predetermined position.

In various embodiments, the apparatus 200 may further include a processor, wherein, upon powering up of the apparatus 200, the processor may be configured to supply a drive signal to the drive assembly 204 to drive the support structure 202 to rotate about the first axis 208 to the first predetermined position and about the second axis 210 to the second predetermined position, and thereafter, the processor may be further configured to supply a home signal to the drive assembly 204 to drive the support structure 202 to rotate about the first axis 208 from the first predetermined position to a home position based on a first set of predetermined steps and about the second axis 210 from the second predetermined position to the home position based on a second set of predetermined steps. In this way, the support structure 202 may be rotated about both the first 208 and second 210 axes to the first and second predetermined positions respectively, and thereafter, based on respective sets of predefined or calculated steps, the support structure 202 may be rotated from the first and second predetermined positions to the home position. This may provide an accurate restoration of the support structure 202 to the home position based on the respective sets of predetermined steps from the first and second predetermined positions.

In various embodiments, the term "powering up" may mean activation or initialization or starting up of the apparatus 200.

In various embodiments, the term "home position" as applied to the support structure 202 may mean a position of the support structure 202 where the support structure 202 may be coaxially aligned with both the first axis 208 and the second axis 210.

In various embodiments, the apparatus 200 may further include at least one detector configured to receive at least one of a visual signal or an audio signal from a user, wherein the drive assembly 204, in response to the at least one of the visual signal or the audio signal received by the at least one detector, may be configured to selectively drive the support structure 202 to rotate about the first axis 208 and to rotate about the second axis 210 automatically towards the user. The at least one detector may include a camera and the visual signal may be an image of the user captured by the camera, and/or an audio input means and the audio signal may be a voice of the user captured by the audio input means, for example, for voice recognition.

A "user" may mean one or more users of the apparatus, e.g., an occupant of the vehicle such as the driver of the vehicle and/or any passenger of the vehicle.

Figure 2B:
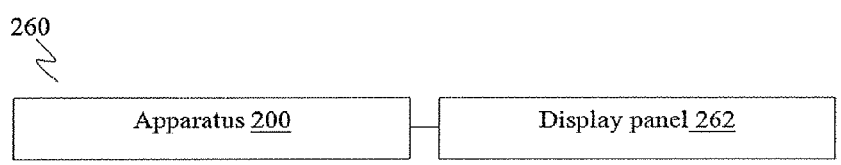
FIG. 2B shows a schematic diagram of a display for a vehicle, according to various embodiments.

FIG. 2B shows a schematic diagram of a display 260 for a vehicle, according to various embodiments. The display 260 may include the apparatus 200 as described herein, and a display panel (or display assembly) 262 supported by the support structure 202 of the apparatus 200. For example, the display panel 262 may be received by the display holder of the support structure 202, and/or secured to the display holder of the support structure 202. The display panel 262 may be a flat display panel. The display panel 262 may include a liquid crystal display (LCD) unit or an organic light-emitting diode (OLED) display unit.

It should be appreciated that descriptions in the context of the apparatus 200 may correspondingly be applicable in relation to the display 260.

Figure 2C:
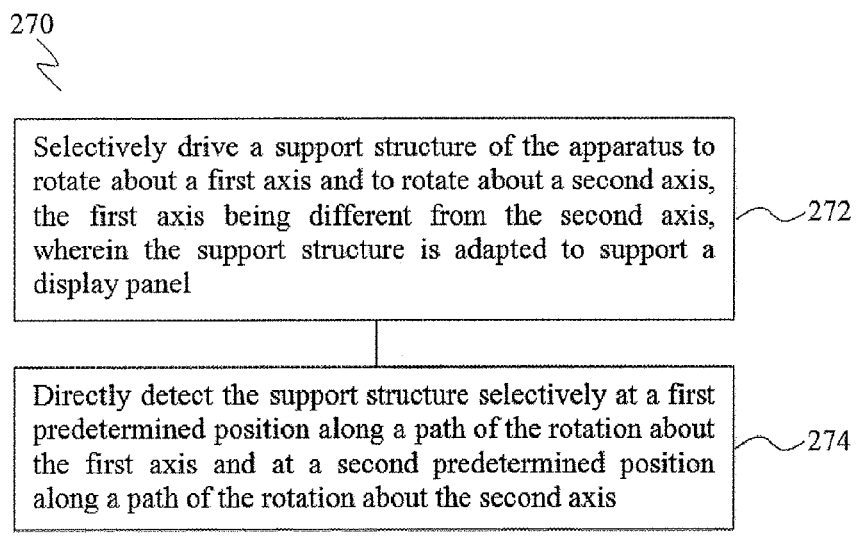
FIG. 2C shows a flow chart illustrating a method for controlling an apparatus for a vehicle, according to various embodiments.

FIG. 2C shows a flow chart 270 illustrating a method for controlling an apparatus for a vehicle, according to various embodiments.

At 272, a support structure of the apparatus is selectively driven to rotate about a first axis and to rotate about a second axis, the first axis being different from the second axis, wherein the support structure is adapted to support a display panel. In various embodiments, the first axis and the second axis may be at least substantially perpendicular to one another.

At 274, the support structure is directly detected selectively at a first predetermined position along a path of the rotation about the first axis and at a second predetermined position along a path of the rotation about the second axis.

In various embodiments, at 274, the method may include directly interacting the support structure with a sensor arrangement of the apparatus located at the first predetermined position and at the second predetermined position to directly detect the support structure selectively at the first and second predetermined positions.

In various embodiments, at 272, the method may include selectively driving a display holder of the support structure to rotate about the first axis and a turn-table of the support structure to rotate about the second axis, wherein the display holder is hingedly connected to the turn-table, and wherein the display holder is adapted to receive the display panel.

In various embodiments, at 272, the support structure may be driven to rotate about both the first and second axes, and, at 274, the support structure may be directly detected at both the first and second predetermined positions.

In various embodiments, the first predetermined position defines a first end position along the path of the rotation about the first axis, and the second predetermined position defines a second end position along the path of the rotation about the second axis, wherein, in response to the detection of the support structure selectively at the first end position and the second end position, a fault signal may be provided to a drive assembly of the apparatus capable of selectively driving the support structure to rotate about a first axis and to rotate about a second axis to prevent any corresponding rotation of the support structure about at least one of the first axis or the second axis beyond the first end position and the second end position.

In various embodiments, upon powering up of the apparatus, the support structure may be driven to rotate about the first axis to the first predetermined position and about the second axis to the second predetermined position, and thereafter, the support structure may be restored to a home position by driving the support structure to rotate about the first axis from the first predetermined position to the home position based on a first set of predetermined steps and driving the support structure to rotate about the second axis from the second predetermined position to the home position based on a second set of predetermined steps.

In various embodiments, at least one of a visual signal or an audio signal may be received from a user, and in response to the at least one of the visual signal or the audio signal received, the support structure may be selectively driven to rotate about the first axis and to rotate about the second axis automatically towards the user.

While the method described above is illustrated and described as a series of steps or events, it will be appreciated that any ordering of such steps or events are not to be interpreted in a limiting sense. For example, some steps may occur in different orders and/or concurrently with other steps or events apart from those illustrated and/or described herein. In addition, not all illustrated steps may be required to implement one or more aspects or embodiments described herein. Also, one or more of the steps depicted herein may be carried out in one or more separate acts and/or phases.

Various embodiments may include a controlling mechanism which may separately control a display to rotate in a Z-direction (e.g., left/right) and in a Y-direction (e.g., up/down), a driving device which drives the controlling mechanism, and a feedback and control algorithm which allows for the detection of the display position.

Figure 3A:
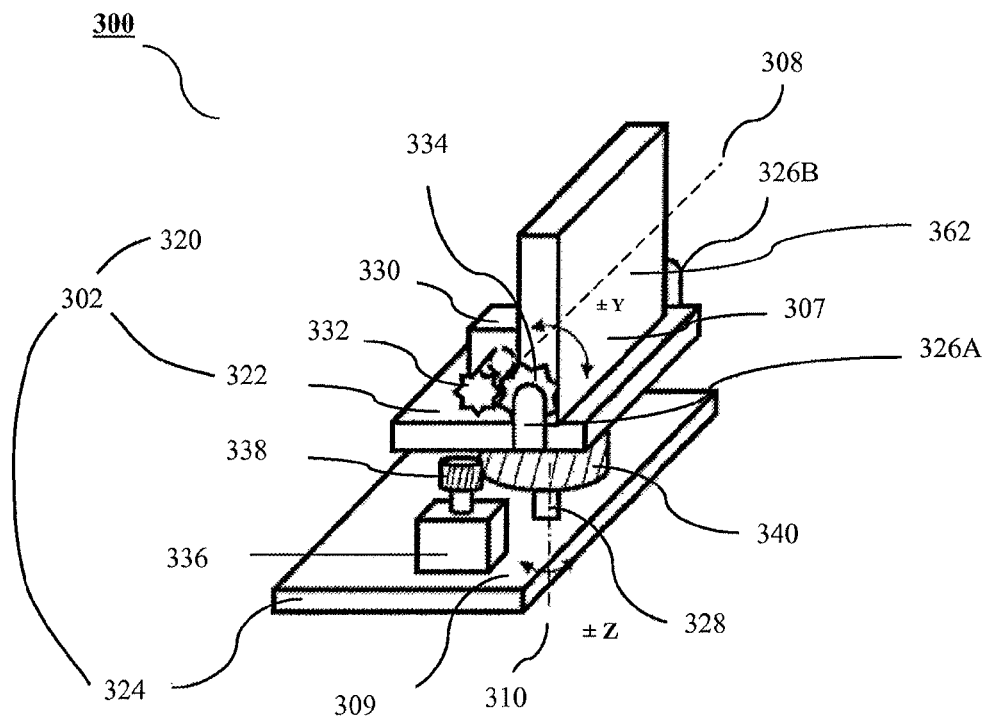
FIGS. 3A and 3B show respectively a schematic perspective view and a schematic side view of an apparatus for a vehicle, according to various embodiments.
Figure 3B:
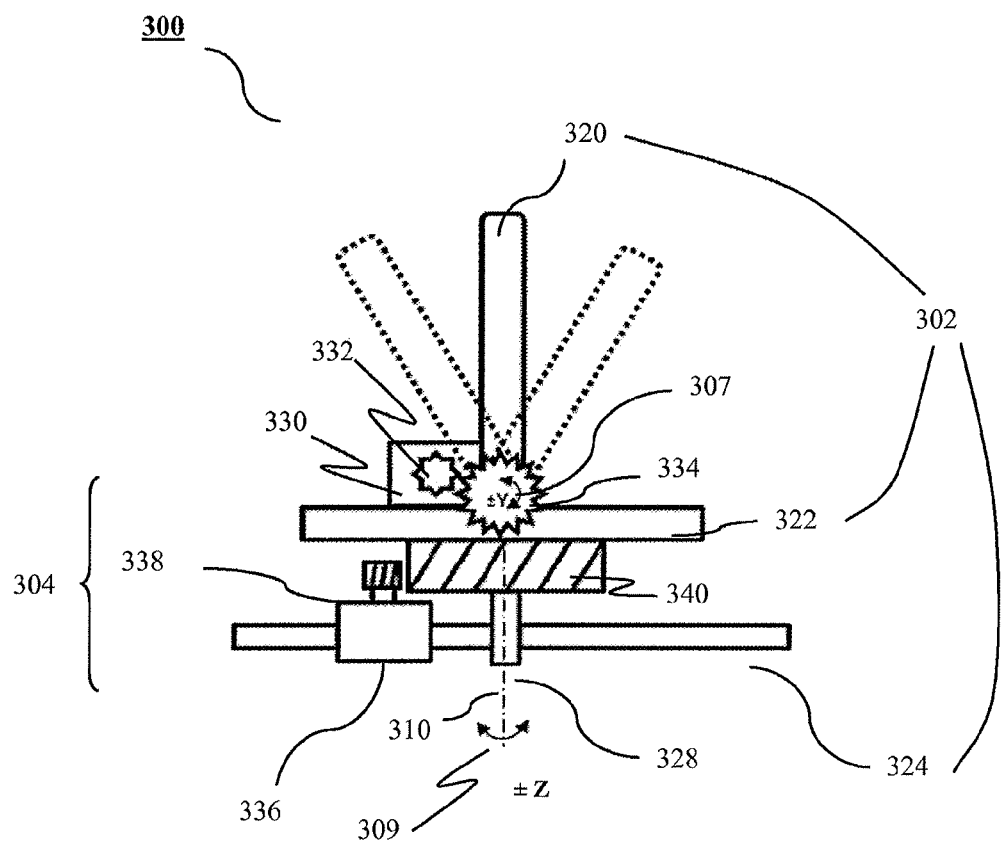

FIGS. 3A and 3B show respectively a schematic perspective view and a schematic side view of an apparatus 300 for a vehicle, according to various embodiments, illustrating collectively the controlling and driving mechanism.

The apparatus 300 may have a support structure 302 including a display holder 320 and a turn-table 322, where the display holder 320 may be hingedly or pivotally connected to the turn-table 322. A pair of connecting elements 326A, 3268 may be provided on or coupled to opposite sides of the turn-table 322 for hinge connection between the display holder 320 and the turn-table 322. For clarity and ease of understanding, the pair of connecting elements 326A, 326B are not shown in FIG. 3B. As shown in FIGS. 3A and 3B, the display holder 320 may be hingedly connected or pivotally connected to the turn-table at the base portion of the display holder 320.

The display holder 320 may support or receive a display panel (or display assembly) 362, e.g., a flat display panel. This may mean that the display panel 362 may be secured onto the display holder 320.

In various embodiments, the support structure 302 may further include a (fixed) frame structure 324, where the turn-table 322 may be pivotally coupled to the frame structure 324. A shaft 328 may be provided through an opening defined through the frame structure 324 and coupled to the turn-table 322 to enable pivotal connection of the turn-table 322 to the frame structure 324.

The apparatus 300 may further include a drive assembly 304 capable of selectively driving the support structure 302 to rotate (represented by the double-headed arrow 307) about a first axis 308 (e.g., Y-axis) and to rotate (represented by the double-headed arrow 309) about a second axis 310 (e.g., Y-axis). Each rotation about the first axis 308 and about the second axis 310 may be bi-directional (e.g., clockwise and anti-clockwise). As illustrated, the first axis 308 and the second axis 310 may be at least substantially perpendicular to each other.

Controlling and Driving in the Y-Direction

The drive assembly 304 may include a first motor (e.g., a stepper motor) 330 having a first driving element (e.g., a driving pinion) 332, and may further include a first driven element (e.g., a driven gear profile) 334 coupled to the display holder 320. The first driven element 334 may be located at the base portion of the display holder 320. The first driving element 332 and the first driven element 334 are arranged to cooperatively drive the display holder 320 to rotate about the first axis 308. For example, the first driving element 332 and the first driven element 334 may engage one another to drive the display holder 320 to rotate about the first axis 308. The first motor 330 may be coupled to or mounted on the turn-table 322. The first motor 330, the first driving element 332 and the first driven element 334 may define a first drive unit.

During operation, the first motor 330 may drive the first driving element 332, which in turn may drive the first driven element 334 so as to drive the display holder 320 to rotate about the first axis 308.

In other words, for controlling and driving in the Y-direction about the first axis 308, the display holder 320 may be hinged on the turn-table 322, for rotation in the Y-direction. There may be a gear profile 334 on the display holder 320, which may be driven by a pinion 332 from a stepper motor (defined as Stepper Motor 2) 330. The stepper motor 330 may be mounted on the turn-table 322. Therefore, a sub-assembly (display holder 320 +stepper motor 2 330 +turn-table 322) may be formed or defined for Y-direction control.

Controlling and Driving in the Z-Direction

The drive assembly 304 may include a second motor (e.g., a stepper motor) 336 having a second driving element (e.g., a driving pinion) 338, and may further include a second driven element (e.g., a driven gear profile) 340 coupled to the turn-table 322, where the second driving element 338 and the second driven element 340 are arranged to cooperatively drive the turn-table 322 to rotate about the second axis 310. For example, the second driving element 338 and the second driven element 340 may engage one another to drive the turn-table 322 to rotate about the second axis 310. The second motor 336 may be coupled to or mounted on the frame structure 324. The second motor 336, the second driving element 338 and the second driven element 340 may define a second drive unit.

During operation, the second motor 336 may drive the second driving element 338, which in turn may drive the second driven element 340 so as to drive the turn-table 322 to rotate about the second axis 310. It should be appreciated that as the turn-table 322 is rotated about the second axis 310, the display holder 320 and the display panel 362 are also indirectly rotated about the second axis 310 in line with the rotation of the turn-table 322 as the display holder 320 is hingedly connected to the turn-table 322 and the display panel 362 is coupled to or received by the display holder 320.

In other words, for controlling and driving in the Z-direction about the second axis 310, the turn-table sub-assembly 322 may be pivoted on the (fixed) frame structure 324, for rotation in the Z-direction. There may be a gear profile 340 on the turn-table 322, which may be driven by a pinion 338 from another stepper motor (defined as Stepper Motor 1) 336. The stepper motor 336 may be mounted on the frame structure 324.

Feedback and Control Algorithm for Position Detection

It should be appreciated that a stepper motor (which is an open-loop driving device) generally does not provide feedback.

In various embodiments, it may be necessary to know and control the display position in the Y and Z directions, precisely and accurately, so as to (i) to allow the motor (or drive assembly) to know the exact direction and angle to rotate, and/or (ii) to prevent over-rotation at the limit in both directions that may cause potential damage.

Figure 4A:
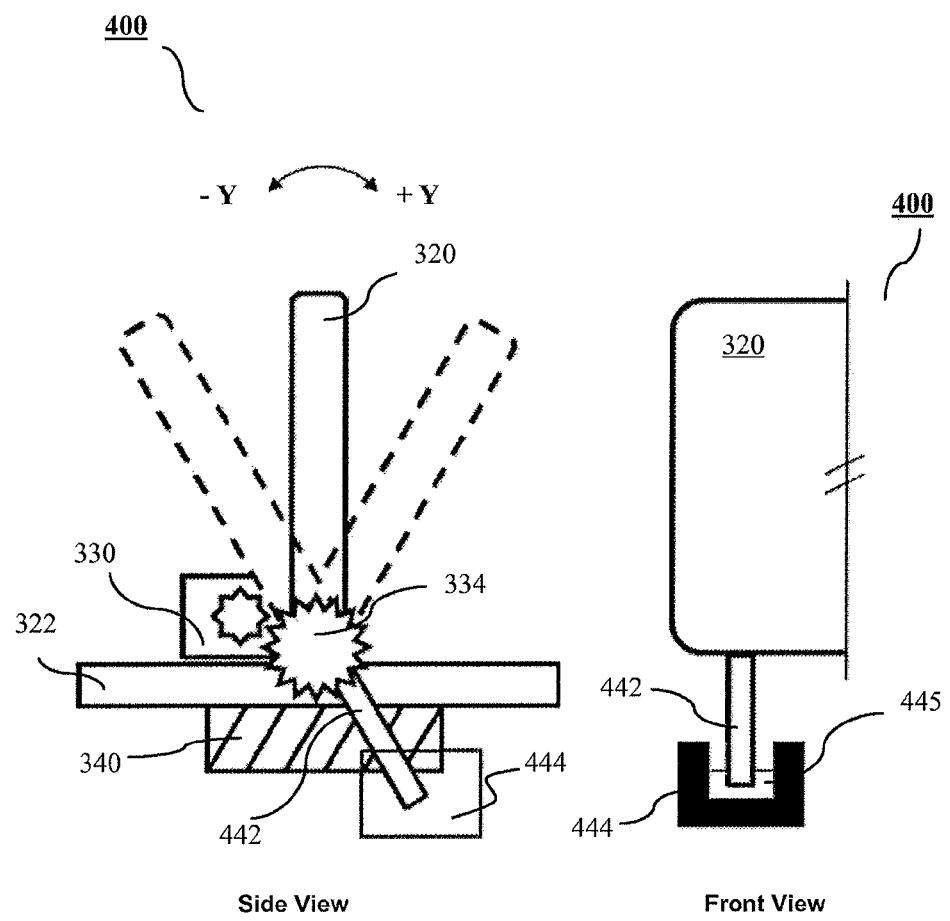
FIGS. 4A and 4B show schematic views illustrating position sensing for the apparatus of various embodiments.
Figure 4B:
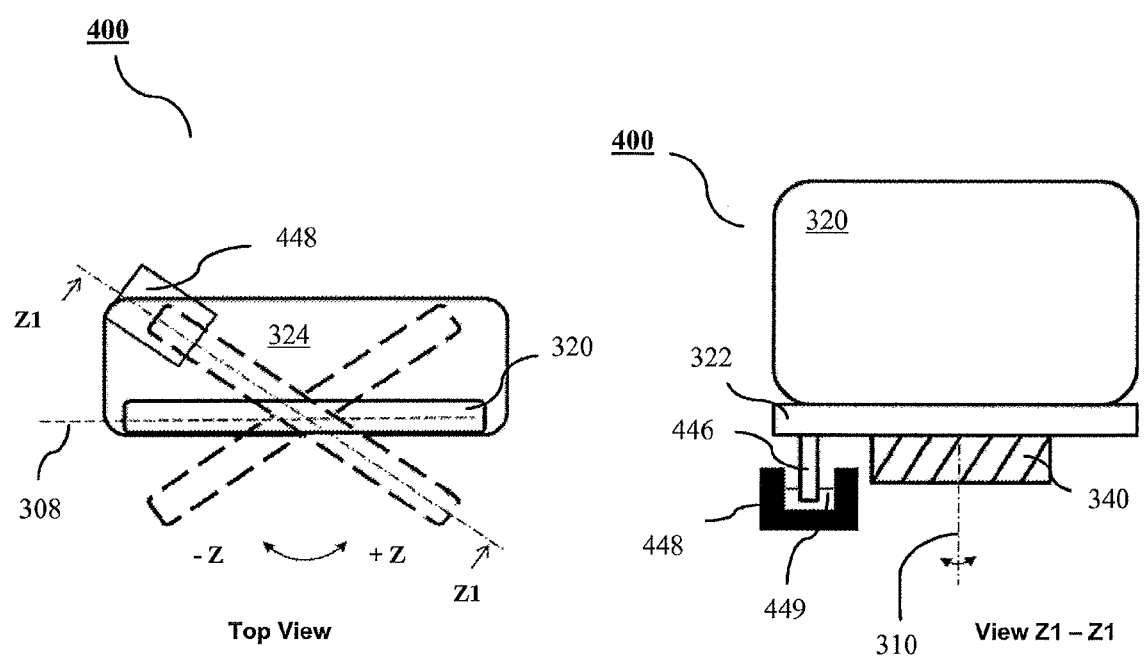

The actual position for the display may be detected using one or more position sensors for each of the Y and Z directions. FIGS. 4A and 4B show schematic views illustrating position sensing for the apparatus 400 of various embodiments. The apparatus 400 may include the various elements as described in the context of the apparatus 300 and therefore descriptions for like elements are omitted here for the apparatus 400. Further, descriptions in the context of the apparatus 400 may similarly be applicable to the apparatus 300. It should be appreciated that, for clarity and ease of understanding, the turn-table 322 may not be shown throughout FIG. 4B, but nevertheless is present.

As illustrated in FIGS. 4A and 4B, the display holder 320 may include a first interrupting member (or first interrupting feature) 442 which may be projected downwardly from the display holder 320, while the turn-table 322 may include a second interrupting member (or second interrupting feature) 446 which may be projected downwardly from the turn-table 322.

The apparatus 400 may further include a sensor arrangement including a first sensor (Position Sensor Y) 444 located at a first predetermined position along a path of rotation about the first axis (Y-axis) 308, and a second sensor (Position Sensor Z) 448 located at a second predetermined position along a path of rotation about the second axis (Z-axis) 310. The first sensor 444 may be coupled or fixed to the turn-table 322 while the second sensor 448 may be coupled or fixed to the frame structure 324. Each of the first sensor 444 and the second sensor 448 may be an infrared (IR) sensor.

For detection in the Y-direction as illustrated in FIG. 4A, the first sensor 444 is triggered when the display holder 320 and the display panel are at, for example, the Position Y1 (first predetermined position). In this position, the first interrupting member 442 from the display holder 320 cuts off the infrared transmission 445 from the first sensor 444, and a signal may then be provided to the system or a processor of the apparatus 400. This may also mean that the interaction between the first interrupting member 442 and the first sensor 444 enables the sensor arrangement of the apparatus 400 to directly detect the support structure at the first predetermined position.

For detection in the Z-direction as illustrated in FIG. 4B, the second sensor 448 is triggered when the display holder 320 and the display panel are at, for example, the Position Z1 (second predetermined position) as a result of rotation of the turn-table 322. In this position, the second interrupting member 446 from the turn-table 322 cuts off the infrared transmission 449 from the second sensor 448, and a signal may then be provided to the system or a processor of the apparatus 400. This may also mean that the interaction between the second interrupting member 446 and the second sensor 448 enables the sensor arrangement of the apparatus 400 to directly detect the support structure at the second predetermined position.

As described, the position detection in both Y and Z directions is directly on the driven parts (e.g., the display holder 320 and the turn-table 322 of the support structure (e.g., 302, FIGS. 3A, 3B)), instead of on the drive assembly (e.g., 304, FIG. 3B) or the driving gear sets. Thus, any misalignment in the drive assembly or the gear sets would not affect the accuracy of the position detection.

Further, in various embodiments, the first predetermined position may define a first end position and the second predetermined position may define a second end position. As non-limiting examples, using the position Y1 as the first end position and the position Z1 as the second end position, when the first sensor 444 directly detects the support structure at the position Y1 (as the first end position) as a result of the interaction between the first sensor 444 and the first interrupting member 442, a corresponding signal may then be provided to the processor of the apparatus, and, in response, the processor may provide a fault signal to the drive assembly to prevent any corresponding rotation about the first axis (Y-axis) beyond the first end position. In other words, the support structure, for example, the display holder 320, may be prevented from being rotated in the -Y direction beyond the position Y1 (first end position).

Correspondingly, when the second sensor 448 directly detects the support structure at the position Z1 (as the second end position) as a result of the interaction between the second sensor 448 and the second interrupting member 446, a corresponding signal may then be provided to the processor of the apparatus, and, in response, the processor may provide a fault signal to the drive assembly to prevent any corresponding rotation about the second axis (Z-axis) beyond the second end position. In other words, the support structure, for example, the turn-table 322, may be prevented from being rotated in the -Z direction beyond the position Z1 (second end position).

In various embodiments, two methods or steps may be provided in the position detection algorithm (e.g., contained or stored in a processor of the apparatus of various embodiments or in a memory accessible by the processor), as described below with reference to FIGS. 5 and 6 respectively.

(i) Find the Home Position During Power-Up

Figure 5:
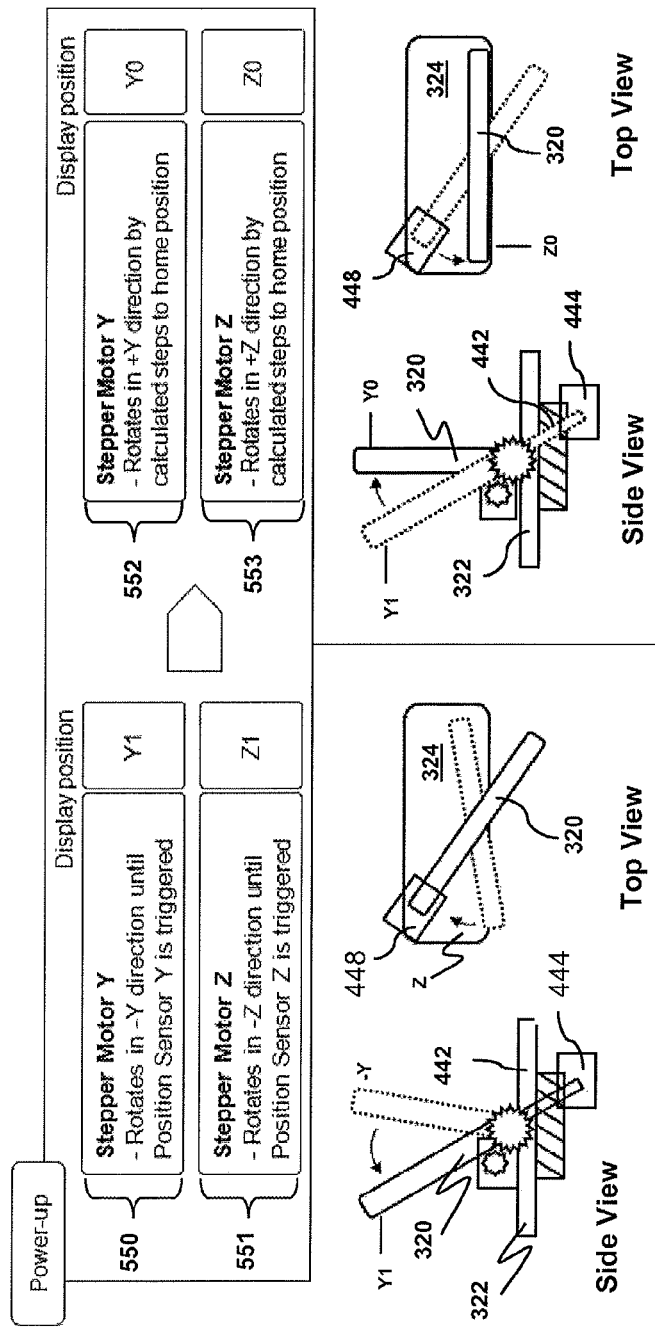
FIG. 5 shows a schematic diagram illustrating a method of finding the home position during power up of the apparatus of various embodiments.

FIG. 5 shows a schematic diagram illustrating a method of finding the home position during power up of the apparatus of various embodiments. It should be appreciated that, for clarity and ease of understanding, the turn-table 322 may not be shown throughout FIG. 5, but nevertheless is present.

At step 550, the first motor (e.g., 330, FIGS. 3A, 3B) rotates the display holder 320 in the -Y direction until the first sensor (Position Sensor Y) 444 is triggered when the display holder 320 is rotated to the first predetermined position (Position Y1). As a non-limiting example, the first motor may receive a drive signal from the processor to carry out this step 550.

At step 551, the second motor (e.g., 336, FIGS. 3A, 3B) rotates the turn-table 322 in the -Z direction until the second sensor (Position Sensor Z) 448 is triggered when the turn-table 322 (and the display holder 320) are rotated to the second predetermined position (Position Z1). As a non-limiting example, the second motor may receive a drive signal from the processor to carry out this step 551.

At step 552, the first motor (e.g., 330, FIGS. 3A, 3B) rotates the display holder 320 in the +Y direction by or based on a first set of predetermined (or calculated) steps to the home position (Position Y0). As a non-limiting example, the first motor may receive a home signal from the processor to carry out this step 552.

At step 553, the second motor (e.g., 336, FIGS. 3A, 3B) rotates the turn-table 322 in the +Z direction by or based on a second set of predetermined (or calculated) steps to the home position (Position Z0). As a non-limiting example, the second motor may receive a home signal from the processor to carry out this step 553.

As a result of the series of steps 550, 551, 552, 533, the display holder 320 (and the display panel coupled to the display holder 320) may be positioned at the home position (Y0, Z0).

It should be appreciated that the steps 550, 551, 552, 553 may be carried out in any sequence or order, except that step 552 is generally performed after step 550, and step 553 is generally performed after step 551. This may mean, for example, the steps to be carried out may be in the sequence of steps 550, 552, 551, 553, or the sequence of steps 550, 551, 552, 553, or the sequence of steps 550, 551, 553, 552, or the sequence of steps 551, 550, 552, 553, etc.

(ii) Find the Desired Position from the Home Position

Figure 6:
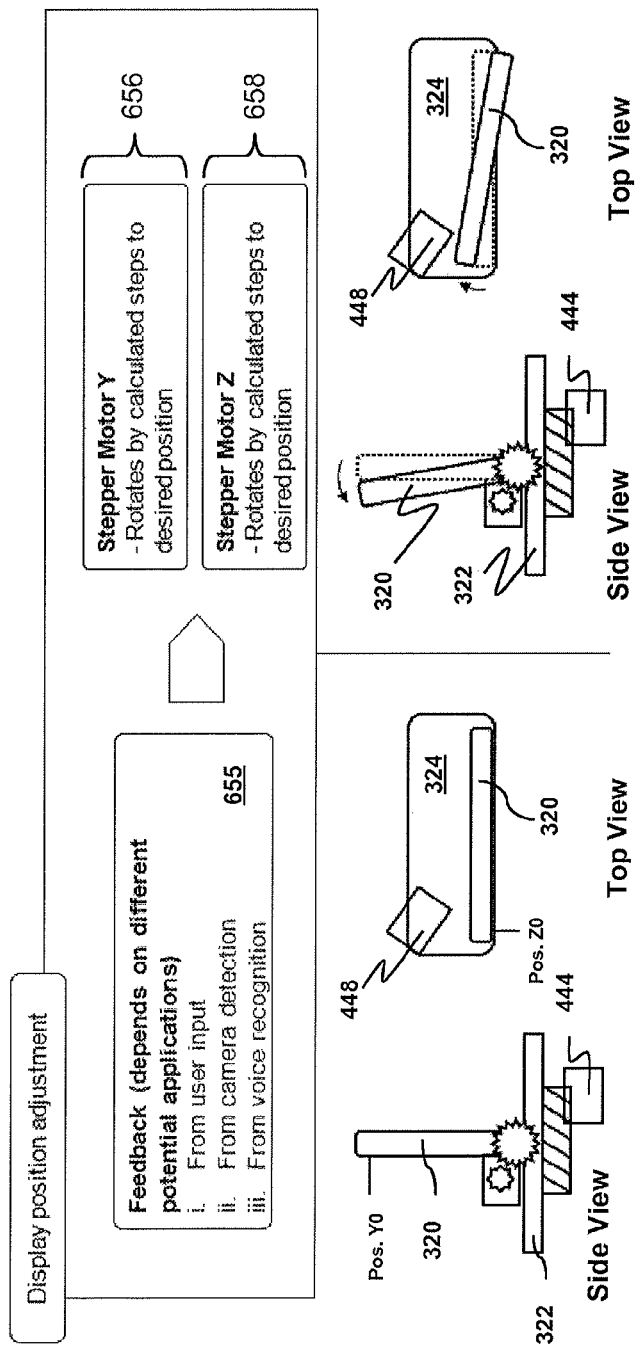
FIG. 6 shows a schematic diagram illustrating a method of finding the desired position from the home position for the apparatus of various embodiments.

FIG. 6 shows a schematic diagram illustrating a method of finding the desired position from the home position for the apparatus of various embodiments. It should be appreciated that, for clarity and ease of understanding, the turn-table 322 may not be shown throughout FIG. 6, but nevertheless is present.

The display holder 320 (and the display panel coupled to the display holder 320) may initially be at the home position (Y0, Z0).

At step 655, for the purpose of display position adjustment, and depending on the applications, feedback may be received by the apparatus from a user via a number of options to adjust the display holder 320 (and the display panel coupled to the display holder 320) to the desired position. For example, the options may include at least one of a user input (e.g., via the user manipulating or interacting with buttons/switches provided with the apparatus of various embodiments) or camera detection of the user (e.g., via use of a camera installed with the apparatus of various embodiments) or voice recognition of the user (e.g., via use of an audio input means installed with the apparatus of various embodiments).

At step 656, in response to the feedback provided to the apparatus, the first motor (e.g., 330, FIGS. 3A, 3B) rotates the display holder 320 to the desired position based on a (third) set of predetermined steps. As a non-limiting example, the first motor may receive a drive signal from the processor to carry out this step 656 in response to the feedback.

At step 658, in response to the feedback provided to the apparatus, the second motor (e.g., 336, FIGS. 3A, 3B) rotates the turn-table 322, and therefore also the display holder 320 hingedly connected to the turn-table 322 to the desired position based on a (fourth) set of predetermined steps. As a non-limiting example, the second motor may receive a drive signal from the processor to carry out this step 658.

In various embodiments, after step 655, at least one of the step 656 or step 658 may be performed depending on the feedback provided to the apparatus for display position adjustment for the display to reach the desired position. This may mean that, after step 655, only step 656 or only step 658 or both the steps 656, 658 (in any order) may be carried out depending on the feedback.

FIGS. 7A to 7F show schematic views of various applications of the apparatus of various embodiments.

Figure 7A:
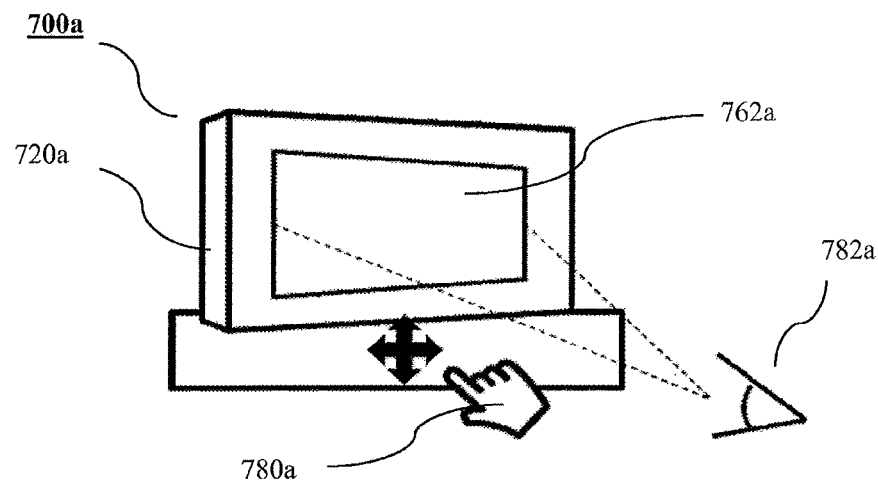
FIGS. 7A to 7F show schematic views of various applications of the apparatus of various embodiments.

Referring to FIG. 7A, a user, using his hand 780a, may provide an input to the apparatus 700a, for example, to rotate the display holder 720a and the display panel 762a towards a rightward direction so that the display panel 762a may be directed to the eye 782a of the user. Therefore, the apparatus 700a may allow, for example, a vehicle user to manually manipulate the viewing direction of the display towards the intended user for better visibility.

Figure 7B:
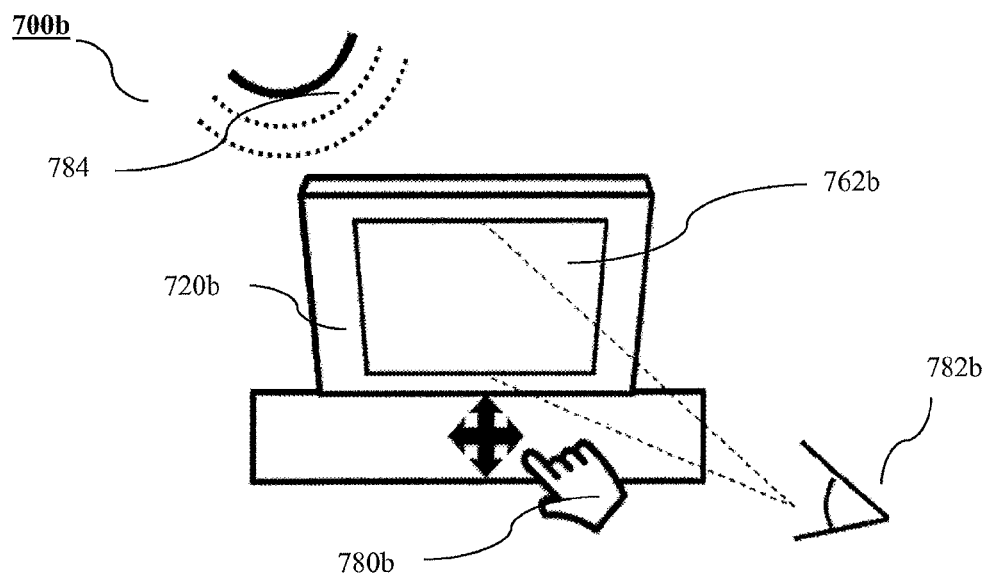

Referring to FIG. 7B, a user, using his hand 780b, may provide an input to the apparatus 700b, for example, to rotate the display holder 720b and the display panel 762b in a downwardly direction so that the display panel 762b may be at least partially shielded from direct sunlight 784 while still being viewable by the eye 782b of the user. Therefore, the apparatus 700b may allow, for example, the display viewing direction to be adjusted manually or automatically to avoid direct sunlight for better visibility.

Figure 7C:
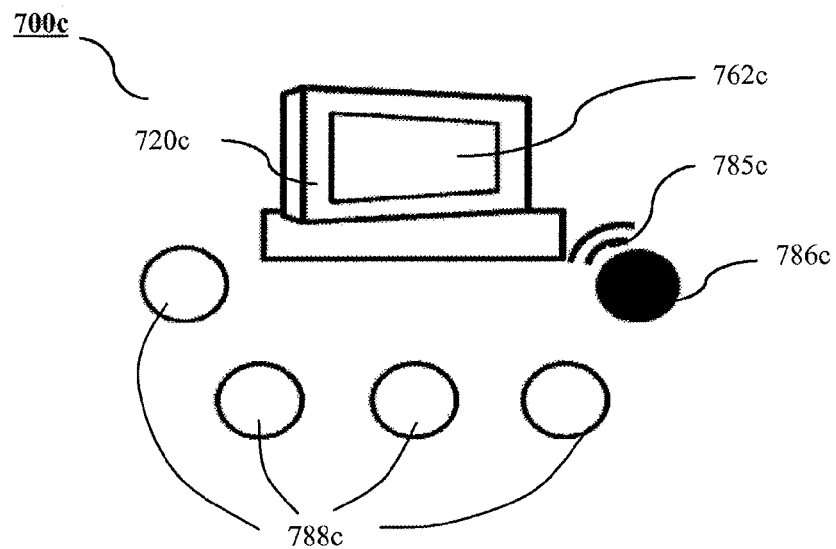
Figure 7D:
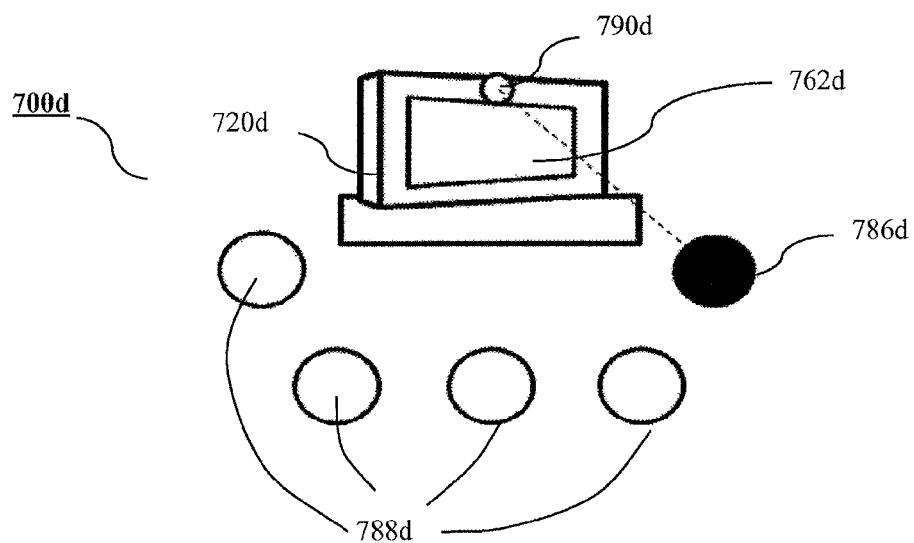

The apparatus of various embodiments may allow automated display adjustment via the application of camera detection and/or voice recognition. When a user is detected by means of camera detection (FIG. 7D) or voice recognition (FIG. 7C), the display may be automatically adjusted towards the target user. Referring to FIG. 7C, voice 785c from a user (e.g., driver) 786c may be recognised/detected by the apparatus 700c, which may then rotate the display holder 720c and the display panel 762c in a direction towards the user 786c, to allow better visibility to the (intended) user 786c as compared to one or more other potential (non-intended) users (e.g., front and/or back passengers) 788c. Referring to FIG. 7D, the user (e.g., driver) 786d may be recognised/detected by the apparatus 700c, for example via a camera 790d installed in the apparatus 700d (e.g., installed at the display holder 720d). The apparatus 700d may then rotate the display holder 720d and the display panel 762d in a direction towards the user 786d, to allow better visibility to the (intended) user 786d as compared to one or more other potential (non-intended) users (e.g., front and/or back passengers) 788d.

Figure 7E:
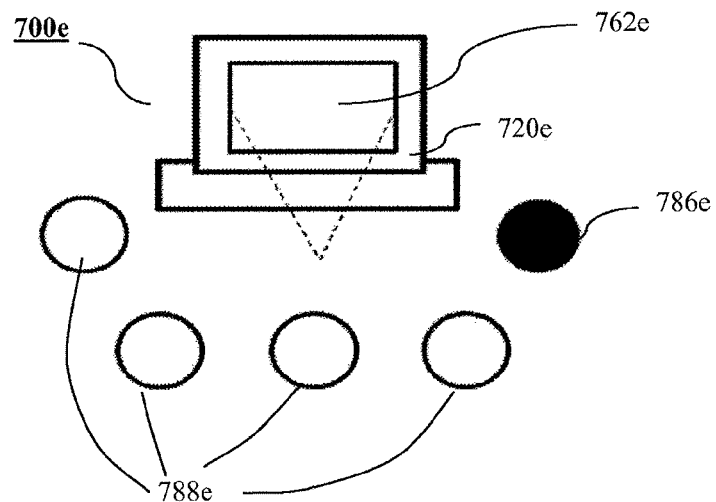
Figure 7F:
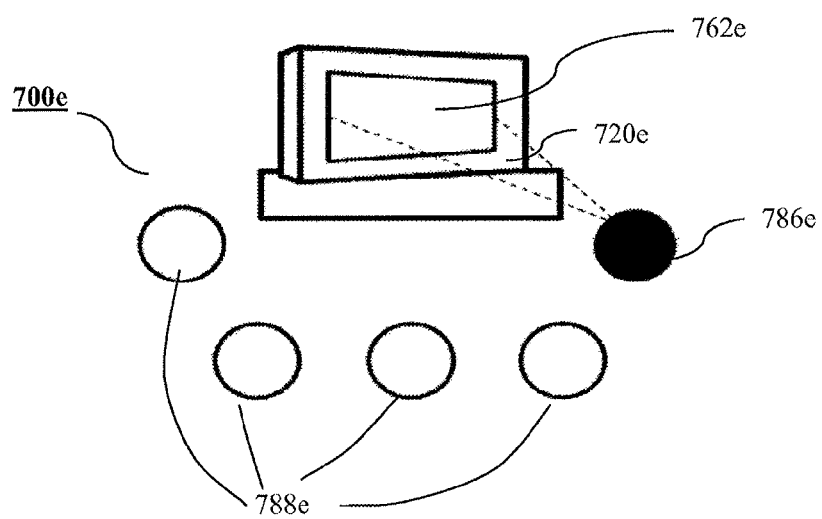

FIGS. 7E and 7F show the apparatus 700e of various embodiments for allowing automated display adjustment in the application of autonomous driving. Referring to FIG. 7E, during autonomous driving, the display may be fully utilized for entertainment purposes. The target users (viewers) may be one or more of the front-seat and rear-seat passengers 788e, rather than the driver 786e. Accordingly, the display holder 720e and the display panel 762d may be rotated to be directed towards the passenger(s) 788e. Referring to FIG. 7F, when required by the driver 786e or when there is an alert (e.g. due to loss of signal), the display may be automatically adjusted towards the driver 786e, away from the passenger(s) 788e, for the driver 786e to take over car control and to have access to car function (e.g., car navigation) immediately. Accordingly, the display holder 720e and the display panel 762e may be rotated to be directed towards the driver 786e.

While the apparatus of various embodiments has been described above as allowing rotation in the Y-direction (i.e., about the first axis 308) by pivoting at the base of the display (or display holder 320), it should be appreciated that, depending on different needs, the Y-direction rotation may be pivoted at another location (e.g., display centre). This may be achieved, for example, by having a timing belt which allows torque transmission across different axes.

Figure 8:
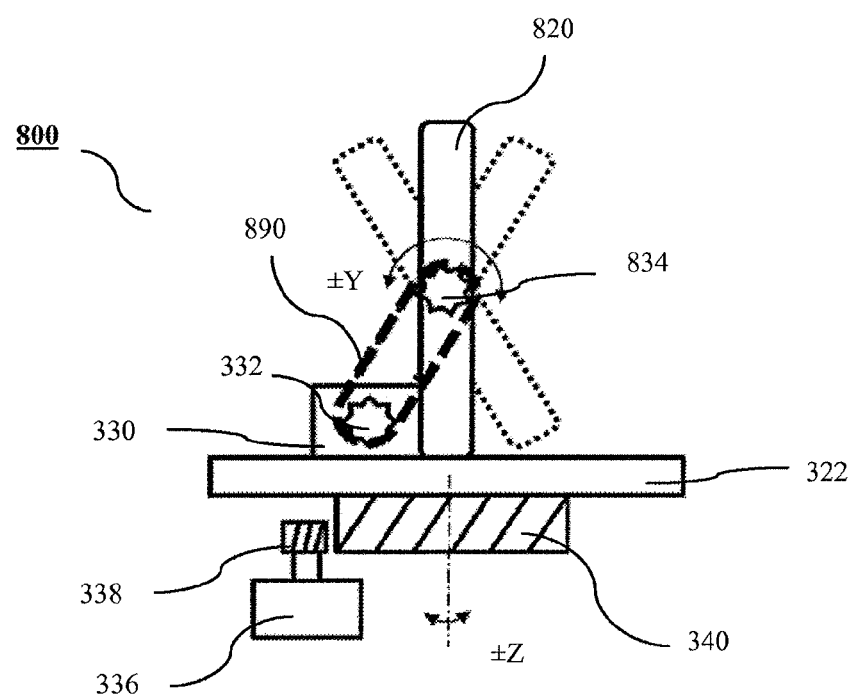
FIG. 8 shows a schematic side view of an apparatus for a vehicle, according to various embodiments.

FIG. 8 shows a schematic side view of an apparatus 800 for a vehicle, according to various embodiments. The apparatus 800 may include the various elements as described in the context of the apparatus 300 and therefore descriptions for like elements are omitted here for the apparatus 800. A first driven element (e.g., gear) 834 may be coupled to a central portion of the display holder 820 so that the central portion of the display holder 820 may act as a pivoting point for rotation of the display holder 820 about the first axis 308 (e.g., see FIG. 3A) in the ±Y direction. A timing belt 890 may be provided and engaged with the first driving element 332 and the first driven element (e.g., a driving pinion) 332 for cooperatively driving the display holder 820 to rotate about the first axis 308.

Various embodiments may be applicable for the purposes of vehicle rear seat entertainment. For example, when the front seat is laid down or when the user or front passenger does not require use of the display, the display may be adjusted, by means of the apparatus of various embodiments, to maintain viewing visibility to one or more rear seat passengers.

While various embodiments have been described in the context of a car, it should be appreciated that various embodiments may be applicable or useful in aircraft interior. For example, during aircraft landing or taking-off, the display may be automatically adjusted back to an original safe position by means of the apparatus of various embodiments.

While aspects of the invention have been particularly shown and described with reference to specific embodiments, it should be understood by those skilled in the art that various changes in form and detail may be made therein without departing from the spirit and scope of the invention as defined by the appended claims. The scope of aspects of the invention is thus indicated by the appended claims and all changes which come within the meaning and range of equivalency of the claims are therefore intended to be embraced.

The invention claimed is:

1. An apparatus for a vehicle, the apparatus comprising:
a support structure adapted to support a display panel;
a drive assembly capable of selectively driving the support structure to rotate about a first axis and to rotate about a second axis, the first axis being different from the second axis; and
a sensor arrangement located at a first predetermined position along a path of the rotation about the first axis and at a second predetermined position along a path of the rotation about the second axis, the sensor arrangement being configured to directly detect the support structure only when the support structure has been rotated to at least one of the first and second predetermined positions.

2. The apparatus as claimed in claim 1, wherein the sensor arrangement is arranged to directly interact with the support structure selectively at the first and second predetermined positions to directly detect the support structure selectively at the first and second predetermined positions.

3. The apparatus as claimed in claim 1, wherein the support structure comprises:
a turn-table; and
a display holder hingedly connected to the turn-table, the display holder being adapted to receive the display panel, wherein the drive assembly is capable of selectively driving the display holder to rotate about the first axis and the turn-table to rotate about the second axis.

4. The apparatus as claimed in claim 3, wherein the drive assembly comprises:
a first drive unit arranged to drive the display holder to rotate about the first axis; and
a second drive unit arranged to drive the turn-table to rotate about the second axis.

5. The apparatus as claimed in claim 4, wherein the first drive unit comprises:
a first motor having a first driving element; and
a first driven element coupled to the display holder,
wherein the first driving element and the first driven element are arranged to cooperatively drive the display holder to rotate about the first axis.

6. The apparatus as claimed in claim 5, wherein the first drive unit further comprises a timing belt engaged with the first driving element and the first driven element for cooperatively driving the display holder to rotate about the first axis.

7. The apparatus as claimed in claim 4, wherein the second drive unit comprises:
a second motor having a second driving element; and
a second driven element coupled to the turn-table,
wherein the second driving element and the second driven element are arranged to cooperatively drive the turn-table to rotate about the second axis.

8. The apparatus as claimed in claim 7, wherein the support structure further comprises a frame structure,
wherein the turn-table is pivotally coupled to the frame structure, and
wherein the second motor is supported on the frame structure.

9. The apparatus as claimed in claim 3, wherein the sensor arrangement is arranged to directly interact with the display holder to directly detect the display holder at the first predetermined position, and to directly interact with the turn-table to directly detect the turn-table at the second predetermined position.

10. The apparatus as claimed in claim 9,
wherein the display holder comprises a first interrupting member, wherein the sensor arrangement is configured to interact with the first interrupting member to directly detect the display holder at the first predetermined position, and
wherein the turn-table comprises a second interrupting member, wherein the sensor arrangement is configured to interact with the second interrupting member to directly detect the turn-table at the second predetermined position.

11. The apparatus as claimed in claim 10, wherein the sensor arrangement comprises:
a first sensor located at the first predetermined position to interact with the first interrupting member; and
a second sensor located at the second predetermined position to interact with the second interrupting member.

12. The apparatus as claimed in claim 11, wherein each of the first sensor and the second sensor comprises an optical sensor.

13. The apparatus as claimed in claim 1, further comprising a processor,
wherein the first predetermined position defines a first end position along the path of the rotation about the first axis, and wherein the second predetermined position defines a second end position along the path of the rotation about the second axis, and
in response to the detection of the support structure by the sensor arrangement selectively at the first end position and the second end position, the processor is configured to provide a fault signal to the drive assembly to prevent any corresponding rotation of the support structure about at least one of the first axis or the second axis beyond the first end position and the second end position.

14. The apparatus as claimed in claim 1, further comprising a processor,
wherein, upon powering up of the apparatus, the processor is configured to supply a drive signal to the drive assembly to drive the support structure to rotate about the first axis to the first predetermined position and about the second axis to the second predetermined position, and thereafter, the processor is further configured to supply a home signal to the drive assembly to drive the support structure to rotate about the first axis from the first predetermined position to a home position based on a first set of predetermined steps and about the second axis from the second predetermined position to the home position based on a second set of predetermined steps.

15. The apparatus as claimed in claim 1, further comprising at least one detector configured to receive at least one of a visual signal or an audio signal from a user,
wherein the drive assembly, in response to the at least one of the visual signal or the audio signal received by the at least one detector, is configured to selectively drive the support structure to rotate about the first axis and to rotate about the second axis automatically towards the user.

16. The apparatus as claimed in claim 1, wherein the first axis and the second axis are at least substantially perpendicular to one another.

17. A display for a vehicle, the display comprising:
the apparatus as claimed in claim 1; and
a display panel supported by the support structure of the apparatus.

18. A method for controlling an apparatus for a vehicle, the method comprising:
selectively driving a support structure of the apparatus to rotate about a first axis and to rotate about a second axis, the first axis being different from the second axis, wherein the support structure is adapted to support a display panel; and
directly detecting the support structure only when the support structure has been rotated to at least one of a first predetermined position along a path of the rotation about the first axis and at a second predetermined position along a path of the rotation about the second axis.

19. The method as claimed in claim 18, wherein directly detecting the support structure comprises directly interacting the support structure with a sensor arrangement of the apparatus located at the first predetermined position and at the second predetermined position to directly detect the support structure selectively at the first and second predetermined positions.

20. The method as claimed in claim 18, wherein selectively driving a support structure of the apparatus comprises:
selectively driving a display holder of the support structure to rotate about the first axis and a turn-table of the support structure to rotate about the second axis, wherein the display holder is hingedly connected to the turn-table, and wherein the display holder is adapted to receive the display panel.

21. The method as claimed in claim 18,
wherein selectively driving a support structure comprises driving the support structure to rotate about both the first and second axes; and
wherein directly detecting the support structure comprises directly detecting the support structure at both the first and second predetermined positions.

22. The method as claimed in claim 18,
wherein the first predetermined position defines a first end position along the path of the rotation about the first axis, and wherein the second predetermined position defines a second end position along the path of the rotation about the second axis;
the method further comprising:
in response to the detection of the support structure selectively at the first end position and the second end position, providing a fault signal to a drive assembly of the apparatus capable of selectively driving the support structure to rotate about a first axis and to rotate about a second axis to prevent any corresponding rotation of the support structure about at least one of the first axis or the second axis beyond the first end position and the second end position.

23. The method as claimed in claim 18, further comprising:
upon powering up of the apparatus, driving the support structure to rotate about the first axis to the first predetermined position and about the second axis to the second predetermined position; and
thereafter, restoring the support structure to a home position by driving the support structure to rotate about the first axis from the first predetermined position to the home position based on a first set of predetermined steps and driving the support structure to rotate about the second axis from the second predetermined position to the home position based on a second set of predetermined steps.

24. The method as claimed in claim 18, further comprising:
receiving at least one of a visual signal or an audio signal from a user; and
in response to the at least one of the visual signal or the audio signal received, selectively driving the support structure to rotate about the first axis and to rotate about the second axis automatically towards the user.

25. The method as claimed in claim 18, wherein the first axis and the second axis are at least substantially perpendicular to one another.

* * * * *